United States Patent [19]

Lassiter et al.

[11] Patent Number: 4,800,181
[45] Date of Patent: Jan. 24, 1989

[54] SILICON CARBIDE REFRACTORY COMPOSITION

[75] Inventors: Perry B. Lassiter, Johnson City; Larry B. Rea, Erwin, both of Tenn.

[73] Assignee: Combustion Engineering, Inc., Windsor, Conn.

[21] Appl. No.: 91,698

[22] Filed: Sep. 1, 1987

[51] Int. Cl.$^4$ ............................................. C04B 35/56
[52] U.S. Cl. ..................................... 501/89; 501/128; 501/133
[58] Field of Search .................... 501/89, 128, 133

[56] References Cited

U.S. PATENT DOCUMENTS

| | | | |
|---|---|---|---|
| 2,559,343 | 7/1951 | Caton | 501/89 |
| 3,230,100 | 1/1966 | Davies et al. | 501/89 |
| 4,093,470 | 6/1978 | Cherry | 501/89 |
| 4,120,829 | 10/1978 | Dulin | 501/89 |
| 4,243,621 | 1/1981 | Mori et al. | 501/89 |
| 4,710,480 | 12/1987 | Buschmann et al. | 501/95 |

FOREIGN PATENT DOCUMENTS 197806  6/1978  Japan ................................ 501/89

OTHER PUBLICATIONS

Hawley, *Condensed Chem. Dict.*, Van Nostrand Reinhold, 10th ed., NY, 1981, pp. 188, 615.

*Primary Examiner*—William R. Dixon, Jr.
*Assistant Examiner*—David M. Brunsman
*Attorney, Agent, or Firm*—William W. Habelt

[57] ABSTRACT

A castable refractory mix composition is disclosed which when fired at a temperature of about 2300° F. will yield a cast refractory article having improved thermal shock resistance and when fired at a higher temperature of about 2750° F. will yield a cast refractory article having improved abrasion resistance. The castable refractory mix composition comprises from about 10 to 15% by weight of an aqueous slip of fine ground fused silica particles, from 25% to 32% by weight of fine alumina particles, from about 55 to 70% by weight of relatively large particle size silican carbide refractory particles, from about 0.015 to 0.04% by weight of a water-soluble wetting agent, and from 0 to about 5% by weight added water.

4 Claims, No Drawings

SILICON CARBIDE REFRACTORY COMPOSITION

BACKGROUND OF THE INVENTION

The present invention relates to refractory compositions and, more particularly, to a cast refractory article formed of a castable refractory mix composition having improved thermal shock resistance when fired at a relatively low temperature 2300° F., and improved abrasion resistance when fired at a higher temperature of about 2750° F.

Silicon carbide refractory compositions are known to be resistant to ferrous and non-ferrous molten metals and slags. However, in order to form such silicon carbide refractory compositions from cast material, they must be fired at a relatively high temperature of about 2700° F. in order to develop satisfactory bonding within the refractory material. Naturally, to fire a refractory mix at such high temperatures requires specifically designed furnaces and a significant expenditure of energy.

It is an object of the present invention to provide a castable refractory composition which when fired at a temperature substantially below 2750° F. will yield a cast refractory article having strength and integrity while exhibiting thermal shock properties equivalent to prior art refractory articles formed from cast refractory mixtures fired in conventional practices at the higher temperature of about 2750° F.

Further, it is an object of the present invention to provide a castable refractory mix composition which when fired at a temperature of 2300° F. or less yields a cast refractory article which maintains good thermal shock properties and exhibits resistance to ferrous and non-ferrous molten metals and slags.

It is an additional object to the present invention to provide a cast refractory article formed of a castable refractory mix composition having been fired at a temperature of about 2300° F. and having improved thermal shock resistance over articles formed from prior art castable refractory mixes fired at a temperature of about 2300° F.

Also, as an object of the present invention to provide a cast refractory article formed of a castable refractory mix composition which exhibits improved abrasion resistance when fired at a temperature of about 2700° F. over articles produced from firing prior art castable refractory mixtures at a temperature of about 2700° F.

SUMMARY OF THE INVENTION

In accordance with the above-mentioned objects, and other objects which will become evident from the disclosure provided herein, the present invention provides a cast refractory article having improved thermal shock resistance formed of the castable refractory mix composition of the present invention when fired at a temperature of about 2300° F., and a cast refractory article having improved abrasion resistance formed of the castable refractory mix composition of the present invention when fired at a temperature of about 2750° F. The castable refractory mix composition of the present invention comprises from about 10 to about 15 percent by weight of an aqueous slip of fine ground fused silica particles, from about 25 to about 32 percent by weight of fine alumina particles, from about 55 to about 75 percent by weight of relatively large particle size silicon carbide refractory particles, from about 0.015 to about 0.4 percent by weight of a water soluble wetting agent, and from 0 to about 5 percent by weight added water.

DESCRIPTION OF THE PREFERRED EMBODIMENTS

The present invention provides a silicon carbide castable refractory mix composition which when fired at a temperature of about 2300° F. produces a refractory body which is resistant to ferrous and non-ferrous molten metals and slags and has good thermal shock properties on initial heat up in service, while maintaining strength and integrity, and which when fired at a temperature of about 2750° F. yields a refractory body which is also resistant to ferrous and non-ferrous molten metal slags and exhibits improved operation resistance properties, while maintaining strength and integrity, but losing some of its resistance to thermal shock on initial heat up in service.

The following table gives the preferred composition and the range of permissible compositions for the castable refractory mix composition of the present invention:

| CONSTITUENTS | PREFERRED WEIGHT % | RANGE WEIGHT % |
| --- | --- | --- |
| Ground Fused Silica | 13 | 10–15 |
| Fine Alumina | 27 | 25–32 |
| Silican Carbide | 60 | 55–70 |
| Dispersant | 0.026 | 0.015–0.04 |
| Added Water | 1.76 | 0.0–5 |

The silica utilized in the refractory mix composition of the present invention is preferably in the form of an aqueous slip of ground fused silica particles produced by wet grinding of fused any conventional, commercially available wet grinder. It has been found that optimal rheological properties for casting purposes are obtained in the resultant refractory mix composition when the silica particles utilized comprise fine fused silica particles produced by wet grinding rather than dry grinding. Additionally, it has been found that wet ground fused silica particles have a greater reactivity since they are in a phase at which they will react more readily with the alumina particles at the firing temperature to form a mullite binding composition. Preferably, a substantial portion of the silica particles have a particle size of about 325 mesh or smaller and, most preferably, have a particle size distribution of at least about 98% less than 325 mesh.

The fine alumina utilized in forming the castable refractory mix composition of the present invention is preferably comprise of alpha alumina particles. Additionally, it is preferred that a substantial portion of the alumina particles have a particle size of about 325 mesh or smaller and, more preferably, have a particle size distribution of at least about 99% less than 325 mesh. Such a fine alumina product is sold by Aluminum Company of America under the designation "A-17 ALUMINA".

The silicon carbide refractory particles utilized in the castable refractory mix composition of the present invention are of a relatively large particle size when compared to the fine silica and fine alumina particles utilized in the mix. Preferably, the silicon carbide refractory particles have a particle size of about -14 mesh or smaller.

It has been found that the fine silica and the fine alumina utilized in the refractory mix composition of the resent invention will form a bond with the silicon carbide aggregate to bind the constituents of the mix to form a cast refractory article when fired at a relatively low temperature of about 2300° F. or lower. As noted hereinbefore, this firing temperature is substantially below that at which silicon carbide refractory mixes are conventionally fired, i.e., at a temperature of about 2750° F., in order to develop the bond necessary to bind the constituents of the cast article together. It is believed that the ultra fine particle size of both the silica and the alumina permit sintering to occur at normal firing schedules at the low firing temperature of 2300° F.

In forming the refractory mix of the present invention, an aqueous slip of wet ground fused silica particles is first formed. Preferably, this aqueous slip is the output slip from a wet grinder wherein fused silica particles have been ground using conventional techniques in the presence of water. Typically, the wet grinding will be carried out such that the aqueous slip of wet ground fused silica particles has a solids content of about 80% by weight. The fine alumina particles and the relatively large silicon carbide particles are then added to the aqueous slip of ground fused silica particles and thoroughly mixed therewith. To optimize the fluidity of the refractory mixture for casting purposes, a wetting agent, also referred to as a dispersant, such as sodium hexametaphosphate, is added. Additional water may also be added. The wetting agent or dispersant is preferably added in an amount sufficient to optimize stability of the resultant castable refractory mix composition at its high solids content and low water content. Although presently preferred wetting agent or dispersant is sodium hexametaphosphate, other commercially available dispersants may be used. The additional water may be added in amounts up to 5 percent by weight of the resulting refractory mix in order to adjust the flowability of the resultant refractory mix to optimize its castability.

As noted previously, the fine alumina and fine wet ground fused silica particles combine to form a mullite composition to bind the silicon carbide aggregate therewith at the lower firing temperatures of 2300° F. or lower. Accordingly, it is preferred that the fine alumina and fine fused silica be mixed in the ratio of 3 moles of alumina particles to 2 moles of silica particles. Such a ratio will facilitate the formation of the mullite bond upon firing of the castable refractory mix composition of the present invention.

It has been found that a cast refractory article formed of the castable refractory mix composition of the present invention will have improved thermal shock resistance when fired at a temperature of about 2300° F. or lower, when compared with the thermal shock resistance of other prior art silicon carbide refractory articles formed by firing at the higher temperature of 2750° F., when both articles are fired at their respective temperatures at normal schedules, conventionally about six hours at the firing temperature. Further, when fired to the conventional higher firing temperature of 2750° F. for the conventional six hour period, it has been found that a cast refractory article formed of the castable refractory mix composition of the present invention will have improved abrasion resistance when compared to an article formed of the mix of the present invention fired at 2300° F., but will lose some of its thermal shock resistance.

While a specific formulation of the castable refractory mix composition of the present invention has been described to illustrate the best mode presently contemplated for carrying out the present invention, it is to be understood that this formulation is by way of illustration only and that the invention is to be limited only by way of the appending claims. Further, it is to be understood that the description of the present invention provided hereinbefore is susceptible to various modifications, changes and adaptations, and that the same are intended to fall within the meaning and range of equivalents of the appended claims.

What is claimed is:

1. A castable refractory mix composition comprising:
   a. from about 10 to about 15% by weight of an aqueous slip of ground fused silica particles, comprising an aqueous dispersion of fine fused silica particles produced by wet grinding such that at least about 98% of said ground fused silica particles have a particle size less than 325 mesh;
   b. from about 25 to about 32% by weight of alumina particles, at least about 99% of said alumina particles having a particle size less than 325 mesh;
   c. from about 55 to about 65% by weight of silicon carbide refractory particles of a relatively large particle size;
   d. from about 0.015 to about 0.04% by weight of a water-soluble wetting agent; and
   e. from 0 to about 5% by weight added water.

2. A castable refractory mix as recited in claim 1 wherein said aqueous slip of wet ground silica particles has a solids content of about 80% by weight.

3. A castable refractory mix consisting essentially of:
   a. about 13% by weight of an aqueous slip of wet ground fused silica particles consisting essentially of an aqueous dispersion of fine fused silica particles produced by wet grinding such that at least about 98% of said ground fused silica particles having a particles size less than 325 mesh;
   b. about 27% by weight of alumina particles having a particle size distribution of at least about 99% less than 325 mesh;
   c. about 60% by weight of relatively large silicon carbide refractory particles having a particle size of about 14 mesh or smaller;
   d. about 0.025% of sodium hexametaphosphate as a dispersant; and
   e. about 1.75% added water.

4. A castable refractory mix as recited in claim 3 wherein said aqueous slip of wet ground silica particles has a solids content of about 80% by weight.

* * * * *